US012609076B2

(12) United States Patent
Huang et al.

(10) Patent No.: US 12,609,076 B2
(45) Date of Patent: Apr. 21, 2026

(54) GRAYSCALE COMPENSATION DATA GENERATION METHOD AND APPARATUS, DEVICE, STORAGE MEDIUM, AND PROGRAM PRODUCT

(71) Applicant: Glenfly Tech Co., Ltd., Shanghai (CN)

(72) Inventors: Long Huang, Shanghai (CN); Jiajun Li, Shanghai (CN); Kun Yang, Shanghai (CN); Jianhong Pan, Shanghai (CN); Chaohai Chang, Shanghai (CN); Lei Huang, Shanghai (CN); Xiaoguang Wang, Shanghai (CN); Wei Zhang, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 0 days.

(21) Appl. No.: 19/009,074

(22) Filed: Jan. 3, 2025

(65) Prior Publication Data

US 2026/0073858 A1 Mar. 12, 2026

(30) Foreign Application Priority Data

Sep. 10, 2024 (CN) .......................... 202411268812.4

(51) Int. Cl.
| | |
|---|---|
| *G09G 3/3225* | (2016.01) |
| *G06V 10/60* | (2022.01) |
| *G09G 5/10* | (2006.01) |

(52) U.S. Cl.
CPC ........... *G09G 3/3225* (2013.01); *G06V 10/60* (2022.01); *G09G 5/10* (2013.01);
(Continued)

(58) Field of Classification Search
CPC ................... G09G 5/10; G09G 3/3225; G09G 2320/0233; G09G 2320/0242; G09G 2320/0626; G09G 2360/145; G06V 10/60
See application file for complete search history.

(56) References Cited

U.S. PATENT DOCUMENTS

| | | | | |
|---|---|---|---|---|
| 2013/0342585 A1* | 12/2013 | Chun | ................... | G09G 3/3208 345/690 |
| 2015/0146017 A1* | 5/2015 | Kim | ................... | H04N 21/4318 348/189 |

(Continued)

*Primary Examiner* — Premal R Patel
(74) *Attorney, Agent, or Firm* — NIXON PEABODY LLP

(57) ABSTRACT

The present disclosure relates to a grayscale compensation data generation method and apparatus, a device, a storage medium, and a program product. The method includes: acquiring brightness data of a plurality of grayscale images captured under a target shooting brightness, different grayscale images corresponding to different display grayscales; determining original grayscale compensation data of pixels corresponding to different display grayscales respectively according to the brightness data of the plurality of grayscale images; determining storage grayscales from a plurality of display grayscales; converting original grayscale compensation data of pixels corresponding to different storage grayscales respectively into target grayscale compensation data of block regions corresponding to the different storage grayscales, the block regions being regions including a plurality of pixels; and storing the target grayscale compensation data of the block regions corresponding to the different storage grayscales. By use of the method, a storage capacity of grayscale compensation values can be compressed.

11 Claims, 6 Drawing Sheets

(52) U.S. Cl.
CPC .............. *G09G 2320/0233* (2013.01); *G09G 2320/0242* (2013.01); *G09G 2320/0626* (2013.01); *G09G 2360/145* (2013.01)

(56)                       References Cited

U.S. PATENT DOCUMENTS

| | | | | |
|---|---|---|---|---|
| 2021/0407371 | A1* | 12/2021 | Huang .................. | G09G 3/2074 |
| 2022/0198977 | A1* | 6/2022 | Kim .......................... | G09G 3/20 |
| 2023/0071956 | A1* | 3/2023 | Hong ....................... | G09G 3/20 |
| 2024/0420611 | A1* | 12/2024 | Yan ...................... | G09G 3/2007 |

* cited by examiner

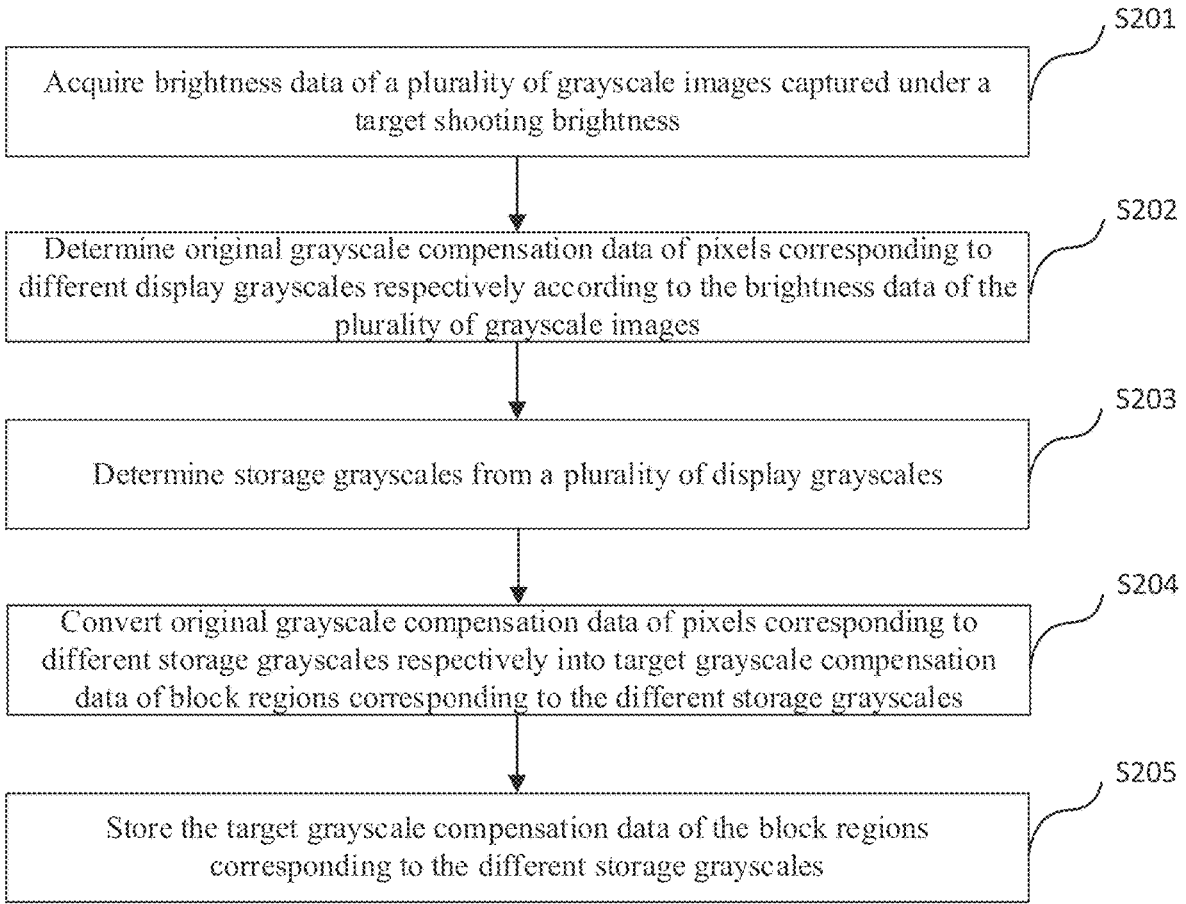

S201

Acquire brightness data of a plurality of grayscale images captured under a target shooting brightness

S202

Determine original grayscale compensation data of pixels corresponding to different display grayscales respectively according to the brightness data of the plurality of grayscale images

S203

Determine storage grayscales from a plurality of display grayscales

S204

Convert original grayscale compensation data of pixels corresponding to different storage grayscales respectively into target grayscale compensation data of block regions corresponding to the different storage grayscales

S205

Store the target grayscale compensation data of the block regions corresponding to the different storage grayscales

FIG. 2

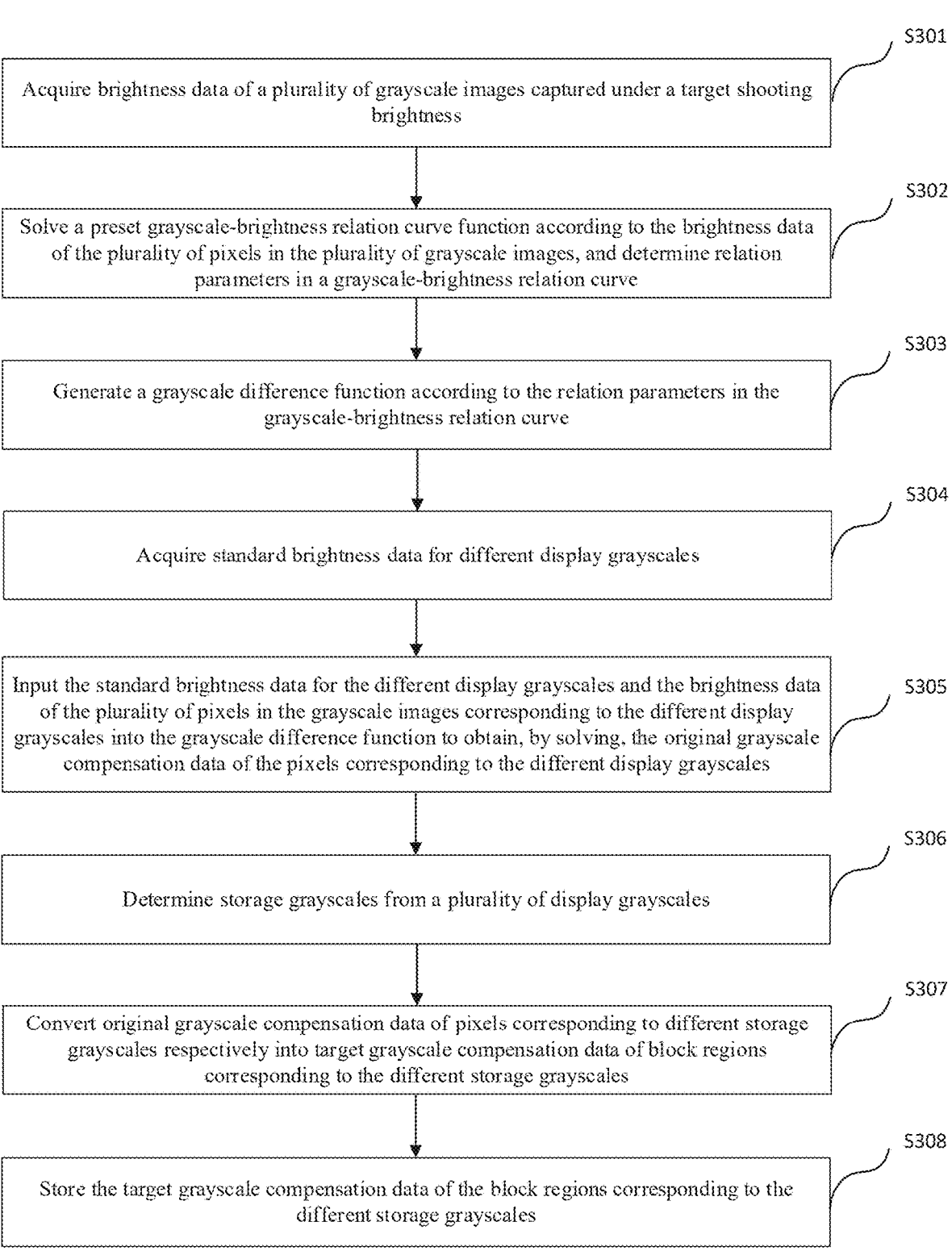

S301

Acquire brightness data of a plurality of grayscale images captured under a target shooting brightness

S302

Solve a preset grayscale-brightness relation curve function according to the brightness data of the plurality of pixels in the plurality of grayscale images, and determine relation parameters in a grayscale-brightness relation curve

S303

Generate a grayscale difference function according to the relation parameters in the grayscale-brightness relation curve

S304

Acquire standard brightness data for different display grayscales

S305

Input the standard brightness data for the different display grayscales and the brightness data of the plurality of pixels in the grayscale images corresponding to the different display grayscales into the grayscale difference function to obtain, by solving, the original grayscale compensation data of the pixels corresponding to the different display grayscales

S306

Determine storage grayscales from a plurality of display grayscales

S307

Convert original grayscale compensation data of pixels corresponding to different storage grayscales respectively into target grayscale compensation data of block regions corresponding to the different storage grayscales

S308

Store the target grayscale compensation data of the block regions corresponding to the different storage grayscales

FIG. 3

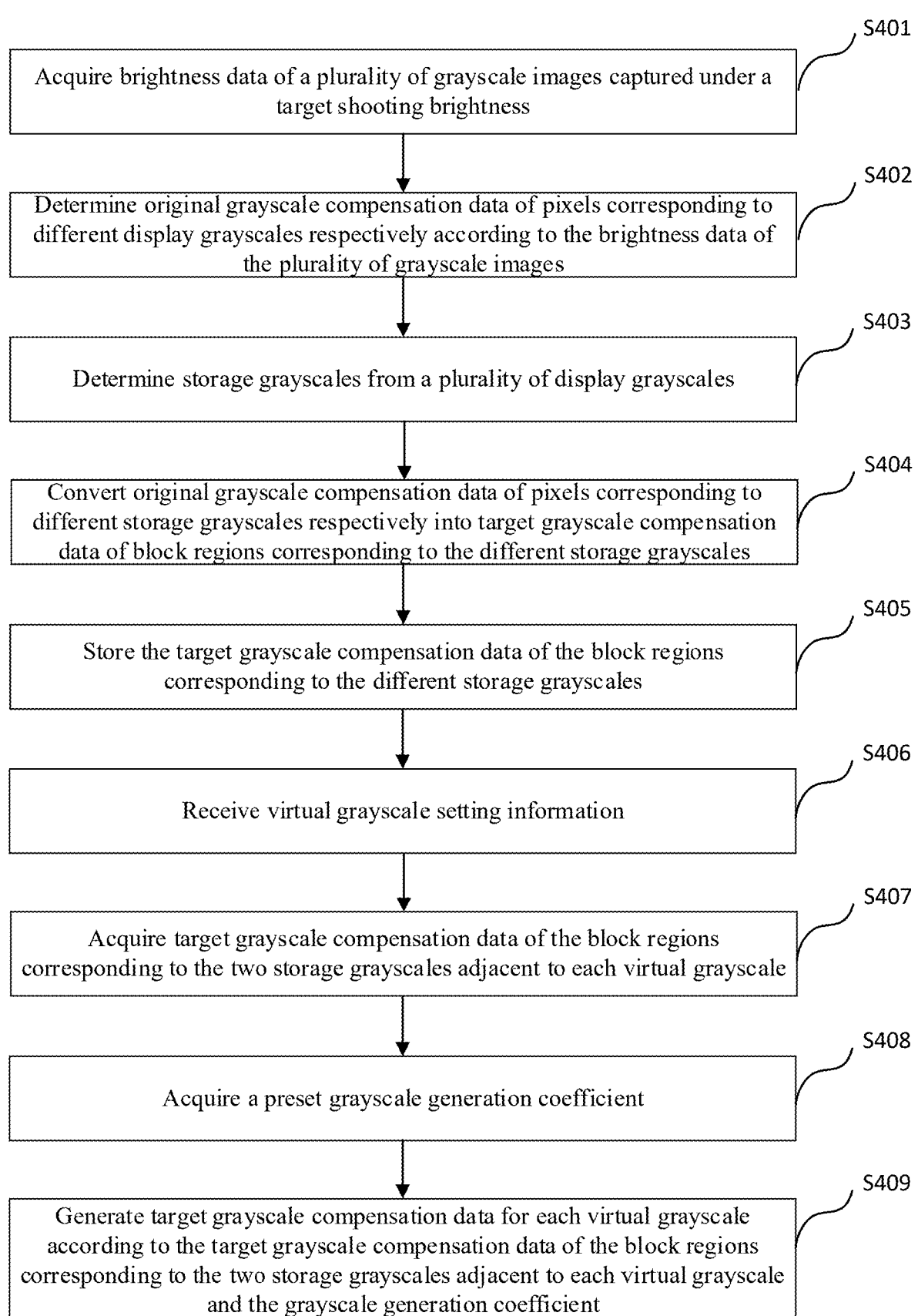

S401

Acquire brightness data of a plurality of grayscale images captured under a target shooting brightness

S402

Determine original grayscale compensation data of pixels corresponding to different display grayscales respectively according to the brightness data of the plurality of grayscale images

S403

Determine storage grayscales from a plurality of display grayscales

S404

Convert original grayscale compensation data of pixels corresponding to different storage grayscales respectively into target grayscale compensation data of block regions corresponding to the different storage grayscales

S405

Store the target grayscale compensation data of the block regions corresponding to the different storage grayscales

S406

Receive virtual grayscale setting information

S407

Acquire target grayscale compensation data of the block regions corresponding to the two storage grayscales adjacent to each virtual grayscale

S408

Acquire a preset grayscale generation coefficient

S409

Generate target grayscale compensation data for each virtual grayscale according to the target grayscale compensation data of the block regions corresponding to the two storage grayscales adjacent to each virtual grayscale and the grayscale generation coefficient

FIG. 4

GRAYSCALE COMPENSATION DATA GENERATION METHOD AND APPARATUS, DEVICE, STORAGE MEDIUM, AND PROGRAM PRODUCT

CROSS REFERENCE TO RELATED APPLICATIONS

This application claims priority under 35 U.S.C. § 119 to Chinese Patent Application No. 2024112688124, filed on Sep. 10, 2024, the entire content of which is incorporated herein in its entirety.

TECHNICAL FIELD

The present disclosure relates to the field of image display technologies, and in particular, to a grayscale compensation data generation method and apparatus, a device, a storage medium, and a program product.

BACKGROUND

An active-matrix organic light-emitting diodes (AMO-LED) screen has characteristics of a wide color gamut, a wide viewing angle, and independent light emission, and is widely used in the field of image display. In order to eliminate uneven display brightness of the AMOLED screen caused by a manufacturing process, the display brightness of the AMOLED screen is generally compensated for by using an image display brightness compensation algorithm.

In the related art, when the display brightness of the AMOLED screen is compensated for by using the image display brightness compensation algorithm, there is a need to calculate grayscale compensation data for each color channel (RGB) under different display grayscales based on a screen size of the AMOLED screen and then store each grayscale compensation data according to a bit width of 5 bits. Therefore, the grayscale compensation data generated in the related art may occupy a larger storage capacity.

SUMMARY

Based on this, there is a need to provided, with respect to the above technical problems, a grayscale compensation data generation method and apparatus, a device, a storage medium, and a program product that can compress a storage capacity of grayscale compensation data.

In a first aspect, the present disclosure provides a grayscale compensation data generation method, including:

acquiring brightness data of a plurality of grayscale images captured under a target shooting brightness, different grayscale images corresponding to different display grayscales;

determining original grayscale compensation data of pixels corresponding to different display grayscales respectively according to the brightness data of the plurality of grayscale images;

determining storage grayscales from a plurality of display grayscales;

converting original grayscale compensation data of pixels corresponding to different storage grayscales respectively into target grayscale compensation data of block regions corresponding to the different storage grayscales, the block regions being regions including a plurality of pixels; and storing the target grayscale compensation data of the block regions corresponding to the different storage grayscales.

In an embodiment, the brightness data of the grayscale images includes brightness data of a plurality of pixels in the grayscale images; and determining the original grayscale compensation data of the pixels corresponding to the different display grayscales respectively according to the brightness data of the plurality of grayscale images includes:

solving a preset grayscale-brightness relation curve function according to the brightness data of the plurality of pixels in the plurality of grayscale images, and determining relation parameters in a grayscale-brightness relation curve;

generating a grayscale difference function according to the relation parameters in the grayscale-brightness relation curve;

acquiring standard brightness data for different display grayscales, the standard brightness data being brightness data in central regions of the corresponding grayscale images; and inputting the standard brightness data for the different display grayscales and the brightness data of the plurality of pixels in the grayscale images corresponding to the different display grayscales into the grayscale difference function to obtain, by solving, the original grayscale compensation data of the pixels corresponding to the different display grayscales.

In an embodiment, converting the original grayscale compensation data of the pixels corresponding to the different storage grayscales respectively into the target grayscale compensation data of the block regions corresponding to the different storage grayscales includes:

acquiring configuration data of at least one block region, the configuration data including a size of the block region and a conversion algorithm of the block region;

determining, from the original grayscale compensation data of the pixels corresponding to the different storage grayscales, original grayscale compensation data of the plurality of pixels included in each of the block regions according to the size of the block region; and processing the original grayscale compensation data of the plurality of pixels included in each of the block regions by using the conversion algorithm of the block region, to obtain the target grayscale compensation data.

In an embodiment, the conversion algorithm includes a median algorithm, a mean rounding algorithm, or a mode algorithm.

In an embodiment, the at least one block region includes a first-level block region and a second-level block region, and a size of the second-level block region being greater than a size of the first-level block region; and processing the original grayscale compensation data of the plurality of pixels included in each of the block regions by using the conversion algorithm of the block region, to obtain the target grayscale compensation data includes:

processing original grayscale compensation data of a plurality of pixels included in the first-level block region by using a conversion algorithm of the first-level block region, to obtain a first compensation calculation value;

processing original grayscale compensation data of a plurality of pixels included in the second-level block region by using a conversion algorithm of the second-level block region, to obtain a second compensation calculation value; and obtaining the target grayscale compensation data according to the first compensation calculation value and the second compensation calculation value.

In an embodiment, the target shooting brightness includes a first shooting brightness and a second shooting brightness; the target grayscale compensation data includes first target grayscale compensation data under the first shooting brightness and second target grayscale compensation data under the second shooting brightness; and the method further includes:

weighting the first target grayscale compensation data and the second target grayscale compensation data, to obtain final grayscale compensation data of the block regions corresponding to the different storage grayscales.

In an embodiment, subsequent to storing the target grayscale compensation data of the block regions corresponding to the different storage grayscales, the method further includes:

receiving virtual grayscale setting information, the setting information being used to set at least one virtual grayscale, a value of the virtual grayscale being in a value interval formed by values of any two storage grayscales;

acquiring target grayscale compensation data of the block regions corresponding to the two storage grayscales adjacent to each virtual grayscale;

acquiring a preset grayscale generation coefficient; and generating target grayscale compensation data for each virtual grayscale according to the target grayscale compensation data of the block regions corresponding to the two storage grayscales adjacent to each virtual grayscale and the grayscale generation coefficient.

In a second aspect, the present disclosure provides a grayscale compensation data generation apparatus, including:

an acquisition module configured to acquire brightness data of a plurality of grayscale images captured under a target shooting brightness, different grayscale images corresponding to different display grayscales;

a processing module configured to determine original grayscale compensation data of pixels corresponding to different display grayscales respectively according to the brightness data of the plurality of grayscale images; determine storage grayscales from a plurality of display grayscales; and convert original grayscale compensation data of pixels corresponding to different storage grayscales respectively into target grayscale compensation data of block regions corresponding to the different storage grayscales, the block regions being regions including a plurality of pixels; and a storage module configured to store the target grayscale compensation data of the block regions corresponding to the different storage grayscales.

In an embodiment, the brightness data of the grayscale images includes brightness data of a plurality of pixels in the grayscale images; and the processing module is further configured to solve a preset grayscale-brightness relation curve function according to the brightness data of the plurality of pixels in the plurality of grayscale images, and determine relation parameters in a grayscale-brightness relation curve; generate a grayscale difference function according to the relation parameters in the grayscale-brightness relation curve; acquire standard brightness data for different display grayscales, the standard brightness data being brightness data of central regions of the corresponding grayscale images; and input the standard brightness data for the different display grayscales and the brightness data of the plurality of pixels in the grayscale images corresponding to the different display grayscales into the grayscale difference function to obtain, by solving, the original grayscale compensation data of the pixels corresponding to the different display grayscales.

In an embodiment, the processing module is further configured to acquire configuration data of at least one block region, the configuration data including a size of the block region and a conversion algorithm of the block region; determine, from the original grayscale compensation data of the pixels corresponding to the different storage grayscales, original grayscale compensation data of the plurality of pixels included in each of the block regions according to the size of the block region; and process the original grayscale compensation data of the plurality of pixels included in each of the block regions by using the conversion algorithm of the block region, to obtain the target grayscale compensation data.

In an embodiment, the conversion algorithm includes a median algorithm, a mean rounding algorithm, or a mode algorithm.

In an embodiment, the at least one block region includes a first-level block region and a second-level block region, and a size of the second-level block region being greater than a size of the first-level block region; and the processing module is further configured to process original grayscale compensation data of a plurality of pixels included in the first-level block region by using a conversion algorithm of the first-level block region, to obtain a first compensation calculation value; process original grayscale compensation data of a plurality of pixels included in the second-level block region by using a conversion algorithm of the second-level block region, to obtain a second compensation calculation value; and obtain the target grayscale compensation data according to the first compensation calculation value and the second compensation calculation value.

In an embodiment, the target shooting brightness includes a first shooting brightness and a second shooting brightness; the target grayscale compensation data includes first target grayscale compensation data under the first shooting brightness and second target grayscale compensation data under the second shooting brightness; and the grayscale compensation data generation apparatus further includes:

an optimization module configured to weight the first target grayscale compensation data and the second target grayscale compensation data, to obtain final grayscale compensation data of the block regions corresponding to the different storage grayscales.

In an embodiment, subsequent to storing the target grayscale compensation data of the block regions corresponding to the different storage grayscales, the optimization module is further configured to receive virtual grayscale setting information, the setting information being used to set at least one virtual grayscale, a value of the virtual grayscale being in a value interval formed by values of any two storage grayscales; acquire target grayscale compensation data of the block regions corresponding to the two storage grayscales adjacent to each virtual grayscale; acquire a preset grayscale generation coefficient; and generate target grayscale compensation data for each virtual grayscale according to the target grayscale compensation data of the block regions corresponding to the two storage grayscales adjacent to each virtual grayscale and the grayscale generation coefficient.

In a third aspect, the present disclosure further provides a computer device, including a memory and a processor. The memory stores a computer program. The processor, when executing the computer program, implements the above grayscale compensation data generation method.

In a fourth aspect, the present disclosure further provides a computer-readable storage medium, having a computer program stored therein. When the computer program is executed by a processor, the above grayscale compensation data generation method is implemented.

In a fifth aspect, the present disclosure further provides a computer program product, including a computer program. When the computer program is executed by a processor, the above grayscale compensation data generation method is implemented.

According to the grayscale compensation data generation method and apparatus, device, storage medium, and program product above, firstly, brightness data of a plurality of grayscale images captured under a target shooting brightness is acquired, and different grayscale images correspond to different display grayscales. Secondly, original grayscale compensation data of pixels corresponding to different display grayscales is determined respectively according to the brightness data of the plurality of grayscale images, and storage grayscales are determined from a plurality of display grayscales. Thirdly, original grayscale compensation data of pixels corresponding to different storage grayscales is converted respectively into target grayscale compensation data of block regions corresponding to the different storage grayscales, and the block regions are regions including a plurality of pixels. Finally, the target grayscale compensation data of the block regions corresponding to the different storage grayscales is stored. During storage of the grayscale compensation data, the original grayscale compensation data of the pixels is converted into the target grayscale compensation data of the block regions in units of block regions, so that a storage capacity of the grayscale compensation data can be compressed.

BRIEF DESCRIPTION OF THE DRAWINGS

In order to more clearly illustrate the technical solutions in embodiments of the present disclosure or the related art, the accompanying drawings used in the description of the embodiments or the related art will be briefly introduced below. It is apparent that, the accompanying drawings in the following description are only some embodiments of the present disclosure, and other drawings can be obtained by those of ordinary skill in the art from the provided drawings without creative efforts.

FIG. 2 is a schematic flowchart of a grayscale compensation data generation method according to embodiments of the present disclosure;

FIG. 3 is a schematic flowchart of another grayscale compensation data generation method according to embodiments of the present disclosure;

FIG. 4 is a schematic flowchart of yet another grayscale compensation data generation method according to embodiments of the present disclosure;

DETAILED DESCRIPTION

Figure 1:
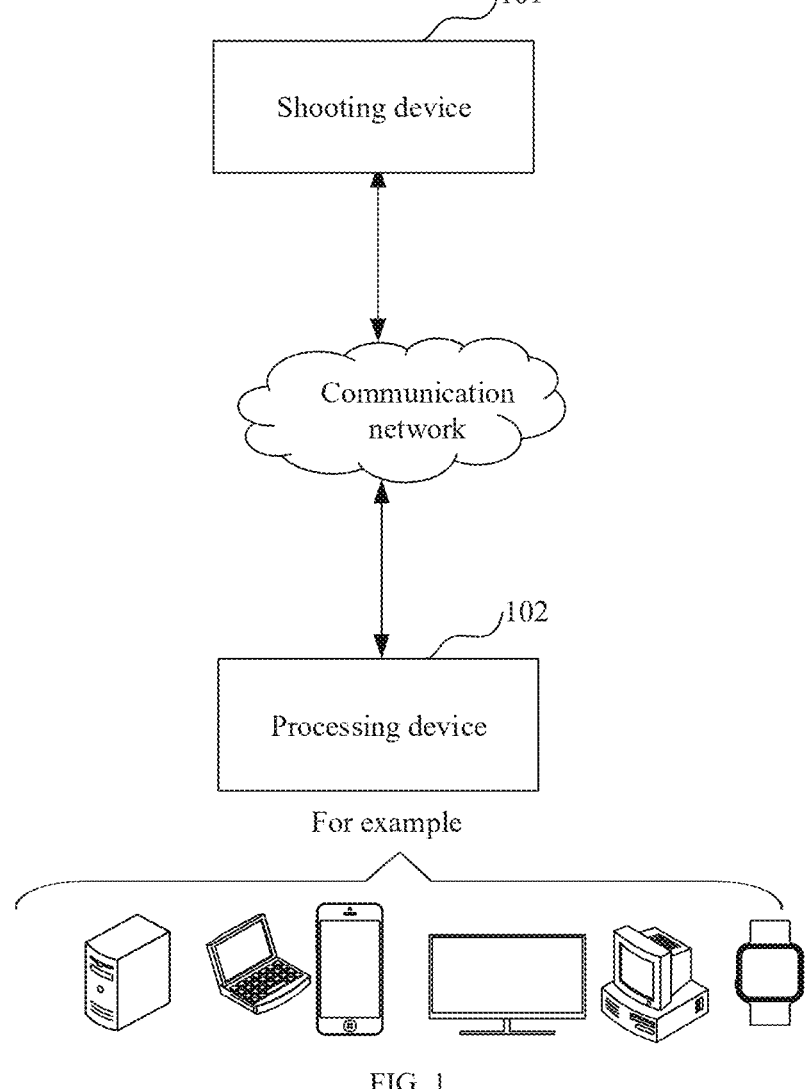
FIG. 1 is a diagram of an application environment of a grayscale compensation data generation method according to embodiments of the present disclosure.

In order to make the objectives, technical solutions, and advantages of the present disclosure clearer, the present disclosure will be further described in detail below with reference to the accompanying drawings and embodiments. It should be understood that the specific embodiments described here are only used to explain the present disclosure and are not used to limit the present disclosure.

The related art is described first below.

An AMOLED screen has characteristics of a wide color gamut, a wide viewing angle, and independent light emission, and is widely used in the field of image display. However, in a manufacturing process of the AMOLED screen, due to factors such as non-uniformity of amorphous silicon (A-SI), unstable pressure of an annealing chamber in an electron beam evaporation (ELA) stage, interference between parallel and scanning directions caused by an optical system, formation of a CVD film, and platform vibration, a large number of defects of uneven display brightness (Mura) may be introduced into the AMOLED screen.

In order to eliminate uneven display brightness of the AMOLED screen caused by a manufacturing process, the display brightness of the AMOLED screen is generally compensated for by using an image display brightness compensation algorithm. Mura compensation is affected by the display brightness. Generally, ON of pixels in the AMOLED screen is controlled by a metal-oxide-semiconductor field-effect transistor (MOSFET) device. The MOSFET device operates in a saturation region, and an on-current of the MOSFET is affected by a threshold voltage, as the display brightness decreases. Corresponding to a critical state of the MOSFET device operating in the saturation region and a linear region, the pixels in the AMOLED may have unstable display effects, resulting in serious color cast and split screen phenomena in the AMOLED screen. In an early stage of the process, Mura compensation is mainly for compensation when a display mode of a display brightness value is normal. Currently, to achieve a better display effect, for low grayscale display in a lower DBV mode, the problem of uneven brightness of pixels of color channels (RGB) is required to be solved, and Mura compensation is also more complicated.

In the related art, when the display brightness of the AMOLED screen is compensated for by using the image display brightness compensation algorithm, there is a need to calculate grayscale compensation data for each color channel (R/G/B) under different display grayscales based on a screen size of the AMOLED screen and then store each grayscale compensation data according to a bit width of 5 bits.

Exemplarily, if the screen size of the AMOLED screen is 2400*1080, grayscale compensation data is stored for the pixels of each RGB color channel, and a bit width of each grayscale compensation data is 5 bits. Then, when grayscale compensation data of the RGB color channels under 3 display grayscales is selected for storage, a required storage space is 2400*1080*3*5=116640000 bit, which is 111.24 Mbit. Therefore, the grayscale compensation data generated in the related art may occupy a larger storage capacity.

In order to solve the above technical problems, embodiments of the present disclosure provide a grayscale compensation data generation method and apparatus, a device, a storage medium, and a program product. According to the grayscale compensation data generation method, during storage of the grayscale compensation data, the original grayscale compensation data of the pixels is converted into the target grayscale compensation data of the block regions in units of block regions, so that a storage capacity of the grayscale compensation data can be compressed.

An application scenario of the grayscale compensation data generation method is described below.

The grayscale compensation data generation method according to embodiments of the present disclosure may be applied to an application environment as shown in FIG. 1. A shooting device 101 communicates with a processing device 102. A data storage system may store data required to be processed by the processing device 102. The data storage system may be integrated on the processing device 102, or may be placed on the cloud or other network servers.

When grayscale compensation data is generated, firstly, the shooting device 101 may acquire brightness data of a plurality of grayscale images captured under a target shooting brightness. Different grayscale images correspond to different display grayscales. The shooting device 101 transmits the brightness data of the plurality of grayscale images captured to the processing device 102. Secondly, the processing device 102 determines original grayscale compensation data of pixels corresponding to different display grayscales respectively according to the brightness data of the plurality of grayscale images, and determines storage grayscales from a plurality of display grayscales. Thirdly, the processing device 102 converts original grayscale compensation data of pixels corresponding to different storage grayscales respectively into target grayscale compensation data of block regions corresponding to the different storage grayscales. The block region is a region including a plurality of pixels. Finally, the processing device 102 stores the target grayscale compensation data of the block regions corresponding to the different storage grayscales.

The shooting device 101 may be a camera, a video camera, or the like. The processing device 102 may be a terminal or a server. The terminal may be, but is not limited to, various personal computers, notebook computers, smart phones, tablet computers, Internet of things devices, or portable wearable devices. The Internet of things devices may be smart speakers, smart televisions, smart air conditioners, smart in-vehicle devices, projection devices, or the like. The portable wearable devices may be smart watches, smart bracelets, head-mounted devices, or the like. The head-mounted devices may be virtual reality (VR) devices, augmented reality (AR) devices, smart glasses, or the like. The server may be a standalone physical server or a server cluster formed by a plurality of physical servers or a distributed system, or a cloud server that provides a cloud computing service.

In an exemplary embodiment, as shown in FIG. 2, a grayscale compensation data generation method is provided. For example, the method is applied to the processing device in FIG. 1, including S201 to S205.

In S201, brightness data of a plurality of grayscale images captured under a target shooting brightness is acquired.

In the present disclosure, the shooting device may collect brightness data of a plurality of grayscale image of a display screen under the target shooting brightness, and then transmit the brightness data of the plurality of grayscale images captured to the processing device.

The brightness data of the grayscale image includes brightness data of a plurality of pixels in the grayscale images.

In some embodiments, there may be one or more target shooting brightnesses, which is not limited in the embodiments of the present disclosure. If there is one target shooting brightness, the processing device may correspondingly acquire a set of brightness data. If there are a plurality of target shooting brightnesses, the processing device may correspondingly acquire a plurality of sets of brightness data.

Exemplarily, the target shooting brightness may include 600 nits in a normal display mode and 10 nits in a low display mode. Correspondingly, the processing device may correspondingly acquire 600-nit brightness data and 10-nit brightness data.

In some embodiments, different grayscale images correspond to different display grayscales. Exemplarily, the plurality of grayscale images may correspond to a plurality of display grayscales such as 16, 32, 96, 160, 192, and 224. Since each grayscale is divided into three color channels: R, G, and B, correspondingly, when the grayscale image for each display grayscale is captured, brightness data corresponding to the three color channels R, G, and B may be captured separately.

In S202, original grayscale compensation data of pixels corresponding to different display grayscales is determined respectively according to the brightness data of the plurality of grayscale images.

In this step, after acquiring the brightness data of the plurality of grayscale images captured under the target shooting brightness, the processing device may determine original grayscale compensation data of pixels corresponding to different display grayscales respectively according to the brightness data of the plurality of grayscale images.

The brightness data of the grayscale image includes brightness data of a plurality of pixels in the grayscale images.

In some embodiments, firstly, the processing device may solve a preset grayscale-brightness relation curve function according to the brightness data of the plurality of pixels in the plurality of grayscale images, and determine relation parameters in a grayscale-brightness relation curve. Secondly, the processing device may generate a grayscale difference function according to the relation parameters in the grayscale-brightness relation curve. Thirdly, the processing device may acquire standard brightness data for different display grayscales. Finally, the processing device may input the standard brightness data for the different display grayscales and the brightness data of the plurality of pixels in the grayscale images corresponding to the different display grayscales into the grayscale difference function to obtain, by solving, the original grayscale compensation data of the pixels corresponding to the different display grayscales.

The standard brightness data is brightness data in central regions of the corresponding grayscale images. Exemplarily, the brightness data in the central region may be an average value of brightness data of 40×40 pixels in the center.

Exemplarily, Formula (1) is a system of equations corresponding to the grayscale-brightness relation curve function, and by inputting the display grayscales of the pixels of the RGB color channels and the corresponding brightness data into Formula (1), relation parameters gamma1 and b1 in a grayscale-brightness relation curve may be obtained by solving.

$$\begin{cases} lg(lum1[i]) = \text{gamma1} * lg(\text{gray1}[i]) + b1 \\ lg(\text{lumi\_mid}[i]) = \text{gamma} * lg(\text{gray}[i]) + b \end{cases} \quad (1)$$

where gray1[i] denotes a value of an $i^{th}$ display grayscale, lum1[i] denotes brightness data corresponding to a pixel of the $i^{th}$ display grayscale, and i∈[16, 32, 64, 128, 192, 224]. Brightness lum_mid[i] corresponding to a central region of the screen is the brightness data in the central region of the grayscale image.

Exemplarily, the processing device substitutes the display grayscales of the pixels of the RGB color channels and the corresponding brightness data in the central region into Formula (1), and other relation data gamma and b in the grayscale-brightness relation curve may also be obtained by solving.

Exemplarily, after obtaining the relation parameters in the grayscale-brightness relation curve by solving, the processing device may construct a grayscale difference function based on the relation parameters gamma1 and b1. The grayscale difference function may be shown in Formula (2).

$$\nabla gray = {}^{\text{gamma1}}\!\!\sqrt{\frac{\text{lum\_mid}}{10^{b1}}} - \text{gray}[i] \quad (2)$$

where ∇gray denotes a grayscale compensation value, gamma1 and b1 are relation parameters in the grayscale-brightness relation curve, gray1[i] denotes a value of an $i^{th}$ display grayscale, and i∈[16, 32, 64, 128, 192, 224].

Exemplarily, after generating the grayscale difference function, the processing device may input the standard brightness data for the different display grayscales and the brightness data of the plurality of pixels in the grayscale images corresponding to the different display grayscales into the grayscale difference function, to obtain, by solving, the original grayscale compensation data of the pixels corresponding to the different display grayscales.

In some embodiments, when the original grayscale compensation data of the pixels corresponding to the different display grayscales is solved, a color channel may be taken as a dimension.

Exemplarily, taking the R channel as an example, the standard brightness data for the different display grayscales and brightness data of a plurality of pixels of the R channel corresponding to the different display grayscales may be inputted into the grayscale difference function, to obtain, by solving, original grayscale compensation data for a display grayscale 16 ∇gray16_R, original grayscale compensation data for a display grayscale 32 ∇gray32_R, original grayscale compensation data for a display grayscale 96 ∇gray96_R, original grayscale compensation data for a display grayscale 128 ∇gray128_R, original grayscale compensation data for a display grayscale 192 ∇gray192_R, and original grayscale compensation data for a display grayscale 224 ∇gray224_R.

Exemplarily, taking the G channel as an example, the standard brightness data for the different display grayscales and brightness data of a plurality of pixels of the G channel corresponding to the different display grayscales may be inputted into the grayscale difference function, to obtain, by solving, original grayscale compensation data for a display grayscale 16 ∇gray16_G, original grayscale compensation data for a display grayscale 32 ∇gray32_G, original grayscale compensation data for a display grayscale 96 ∇gray96_G, original grayscale compensation data for a display grayscale 128 ∇gray128_G, original grayscale compensation data for a display grayscale 192 ∇gray192_G, and original grayscale compensation data for a display grayscale 224 ∇gray224_G.

In S203, storage grayscales are determined from a plurality of display grayscales.

In this step, after the original grayscale compensation data of the pixels corresponding to the different display grayscales is determined, storage grayscales may be determined from a plurality of display grayscales.

The storage grayscales may be display grayscales corresponding to to-be-stored target grayscale compensation data.

It should be understood that how to determine the storage grayscales from the plurality of display grayscales is not limited in the embodiments of the present disclosure. In some embodiments, the processing device may receive indication information entered by a user and select one or more storage grayscales from the plurality of display grayscales.

Exemplarily, for original grayscale compensation data for six display grayscales of 16, 32, 64, 128, 192, and 224, three may be selected as storage grayscales. For example, 16, 64, and 192 may be selected as storage grayscales.

In S204, original grayscale compensation data of pixels corresponding to different storage grayscales is converted respectively into target grayscale compensation data of block regions corresponding to the different storage grayscales.

In this step, after determining the storage grayscales from the plurality of display grayscales, the processing device may convert original grayscale compensation data of pixels corresponding to different storage grayscales respectively into target grayscale compensation data of block regions corresponding to the different storage grayscales.

The block region is a region including a plurality of pixels.

In some embodiments, the processing device may acquire configuration data of at least one block region, and the configuration data includes a size of the block region and a conversion algorithm of the block region. Then, the processing device may determine, from the original grayscale compensation data of the pixels corresponding to the different storage grayscales, original grayscale compensation data of the plurality of pixels included in each of the block regions according to the size of the block region. Finally, the processing device may process the original grayscale compensation data of the plurality of pixels included in each of the block regions by using the conversion algorithm of the block region, to obtain the target grayscale compensation data.

It should be understood that the size of the block region is not limited in the embodiments of the present disclosure, which may be, for example, 1 (row)×2 (columns), 2×1, 2×2, 2×4, 4×2, 4×4, or the like. The block regions with sizes of 1×2 and 2×1 may include 2 pixels. The block regions with a size of 2×2 may include 4 pixels. The block regions with sizes of 2×4 and 4×2 may include 8 pixels. The block regions with a size of 4×4 may include 16 pixels.

In some embodiments, according to the sizes of the block regions, the processing device may determine pixels included in each block region. Then, the original grayscale compensation data of the plurality of pixels included in each block region may be processed by using the conversion algorithm of the block region, to obtain the target grayscale compensation data.

The conversion algorithm of the block region may include a median algorithm, a mean rounding algorithm, or a mode algorithm.

Exemplarily, taking the R channel as an example, a block region of 4×3 is selected, original grayscale compensation data of pixels included therein is [1,4,2,3,2,−1,−4,−3,2,2,−3,2], and the original grayscale compensation data is sorted as [−3,−3,−4,−1,1,2,2,2,2,2,3,4]. Then, the processing device determines according to the median algorithm that a median of the original grayscale compensation data is 2, and the target grayscale compensation data of the block region is 2.

Exemplarily, the processing device may alternatively determine according to the mean rounding algorithm that a mean value of the original grayscale compensation data is 0.58 and is rounded up to 1, and the target grayscale compensation data of the block region is 1.

Exemplarily, the processing device may alternatively determine according to the mode algorithm that a mode of the original grayscale compensation data is 2, and the target grayscale compensation data of the block region is 2.

Exemplarily, Table 1 is a parameter table of a block region according to embodiments of the present disclosure. As shown in Table 1, stored in the manner of 1×1, original grayscale compensation data values of pixels of the R channel in three display grayscales 16, 64, and 192 require 4 bits, a G compensation value requires 5 bits, a B compensation value requires 4 bits, and the total storage requires $1080*2400*3*(4+5+4)=101088000$ Bit-96.4 Mbit, that is, a data storage capacity of about 32.14 Mbit*3. However, in the case of storage in the manner of the block region (4×3), the storage capacity is $1080*2400*(4/12+5+4/12)$ $*3=14688000$ bit*3=14 Mbit*3=42 Mbit, and 42 Mbit is much less than 96.4 Mbit, that is, the storage mode of the plurality of block regions can effectively reduce the storage capacity.

TABLE 1

| Screen size of AMOLED: 1080*2400 | | | |
|---|---|---|---|
| Storage grayscale | 16 | 64 | 192 |
| Color channel | R/G/B | R/G/B | R/G/B |

TABLE 1-continued

| Screen size of AMOLED: 1080*2400 | | | | | | |
|---|---|---|---|---|---|---|
| Storage grayscale | 16 | | 64 | | 192 | |
| Block region Bit | 1 × 1 | 4 × 3/1 × 1/4 × 3 4/5/4 | 1 × 1 | 4 × 3/1 × 1/4 × 3 4/5/4 | 1 × 1 | 4 × 3/1 × 1/4 × 3 4/5/4 |
| Storage consumption | 32.14 Mbit | 14 Mbit | 32.14 Mbit | 14 Mbit | 32.14 Mbit | 14 Mbit |

In some embodiments, the at least one block region includes a first-level block region and a second-level block region, and a size of the second-level block region is greater than a size of the first-level block region. Correspondingly, firstly, the processing device may process original grayscale compensation data of a plurality of pixels included in the first-level block region by using a conversion algorithm of the first-level block region, to obtain a first compensation calculation value. Then, the processing device may process original grayscale compensation data of a plurality of pixels included in the second-level block region by using a conversion algorithm of the second-level block region, to obtain a second compensation calculation value. Finally, the processing device may obtain the target grayscale compensation data according to the first compensation calculation value and the second compensation calculation value.

Exemplarily, in the case of storage by means of block regions, both first-level block regions (small block regions) and second-level block regions (large block regions) may be included, so that the target grayscale compensation data can be obtained and stored in a manner of two-level block regions.

Exemplarily, sizes of the first-level block regions may be 1×2, 2×1, 2×2, 2×4, 4×2, 4×4, and the like, and sizes of the second-level block regions may be 8×8 and 16×16. Table 2 is a parameter table of a multi-level block region according to embodiments of the present disclosure. As shown in Table 2, bit widths of the second-level block regions may be 5 bits and 6 bits. The first compensation calculation value and the second compensation calculation value may satisfy Formula (3).

$$\nabla \text{gray}_{i\_new}=(\text{offset1}+\text{offset2})<<Q \qquad (3)$$

where $\nabla \text{gray}_{i\_new}$ denotes the target grayscale compensation data, offset1 denotes the first compensation calculation value, offset2 denotes the second compensation calculation value, and Q denotes a digital amplification magnitude.

TABLE 2

| Storage grayscale | 128 | | 256 | 896 |
|---|---|---|---|---|
| Color channel | R/G | B | R/G/B | R/G/B |
| First-level block region | 2 × 4 | 1 × 1 | 2 × 4 | 2 × 4 |
| Compression | Compression Level 2 | | None | Compression Level 2 |
| Offset1(bit) | 5/5 | 5 | 6/6/6 | 4/4/4 |
| Size 1 | m * n * Offset1/first-level block region | | | |
| First-level block region | On the basis of the first-level block region | | | |
| Offset2(bit) | 6/6 | 6 | 0 | 5/5/5 |
| Size 2 | m * m * Offset2/first-level block region/second-level block region | | | |
| Amount of compression | (Offset1 + Offset2) * 4 | Offset1 * 4 | (Offset1 + Offset2) * 4 | |

It should be understood that, for the original grayscale compensation data for the storage grayscales, since each storage grayscale includes the original grayscale compensation data of the pixels corresponding to the three channels R, G, and B, each pixel includes different storage bit widths (for example, 3 bits, 4 bits, and 5 bits). If the original grayscale compensation data of each pixel is stored in a 1×1 mode, that is, the original grayscale compensation data of each pixel is stored, a larger storage space is consumed. However, in the present disclosure, one block region includes a plurality of pixels, and original grayscale compensation data of the plurality of pixels is converted into target grayscale compensation data of the block region, so that storage consumption can be greatly reduced. In addition, the storage consumption may be further compressed by combining multi-level regions.

In S205, the target grayscale compensation data of the block regions corresponding to the different storage grayscales is stored.

In this step, after obtaining the target grayscale compensation data of the block regions corresponding to the different storage grayscales, the processing device may store the target grayscale compensation data of the block regions corresponding to the different storage grayscales.

In the present disclosure, when the target grayscale compensation data is stored, the target grayscale compensation data may be optimized in a variety of manners.

In some embodiments, the target shooting brightness includes a first shooting brightness and a second shooting brightness, and the target grayscale compensation data includes first target grayscale compensation data under the first shooting brightness and second target grayscale compensation data under the second shooting brightness. The processing device may weight the first target grayscale compensation data and the second target grayscale compensation data, to obtain final grayscale compensation data of the block regions corresponding to the different storage grayscales.

Exemplarily, in the case of low-grayscale Mura compensation, there are factors that affect accuracy of compensation. Therefore, 2 sets of brightness data [32, 64, 128, 192, 224] under the first shooting brightness and the second shooting brightness are shot, including brightness data at a maximum brightness of 600 nits and the brightness data at a maximum brightness of 10 nits in a normal shooting mode. Correspondingly, after calculation of compensation data, the first target grayscale compensation data and the second target grayscale compensation data may be obtained. The first target grayscale compensation data and the second target grayscale compensation data may be weighted as shown in Formula (4), to obtain final grayscale compensation data.

$$Vgray_i = Vgray1_i * a + Vgray2_i * b \qquad (4)$$

where a and b denote weight adjustment values of the target grayscale compensation data, $Vgray1_i$ denotes the first target grayscale compensation data, $Vgray2_i$ denotes the second target grayscale compensation data, and gray; denotes the final grayscale compensation data.

In some other embodiments, the processing device may further receive virtual grayscale setting information, the setting information is used to set at least one virtual grayscale, and a value of the virtual grayscale is in a value interval formed by values of any two storage grayscales. Then, the processing device may acquire target grayscale compensation data of the block regions corresponding to the two storage grayscales adjacent to each virtual grayscale, and acquire a preset grayscale generation coefficient. Finally, the processing device may generate target grayscale compensation data for each virtual grayscale according to the target grayscale compensation data of the block regions corresponding to the two storage grayscales adjacent to each virtual grayscale and the grayscale generation coefficient.

Exemplarily, the storage grayscales may include 16, 96, and 192. Then, a virtual grayscale 32 may be set in a value interval formed by 16 and 96, and a virtual grayscale 128 may be set in a value interval formed by 96 and 192. Then, the processing device may acquire target grayscale compensation data of the storage grayscales 16 and 96 adjacent to the virtual grayscale 32, and acquire target grayscale compensation data of the storage grayscales 96 and 192 adjacent to the virtual grayscale 128. Moreover, the processing device may acquire preset grayscale generation coefficients m1, n1, m2, and n2. Target grayscale compensation data of the virtual grayscale 32 may be obtained by multiplying the target grayscale compensation data of 16 and 96 by the corresponding grayscale generation coefficients respectively and then performing addition. Target grayscale compensation data of the virtual grayscale 128 may be obtained by multiplying the target grayscale compensation data of 96 and 192 by the corresponding grayscale generation coefficients respectively and then performing addition.

Exemplarily, the target grayscale compensation data of the virtual grayscales 32 and 128 may be shown in Table 3.

TABLE 3

| Storage grayscale/virtual grayscale | 16 | 32 | 96 | 128 | 192 |
|---|---|---|---|---|---|
| Target grayscale compensation data | $Vgray_{16}$ | $Vgray_{16} * m1 + Vgray_{96} * n1$ | $Vgray_{96}$ | $Vgray_{96} * m2 + Vgray_{192} * n2$ | $Vgray_{192}$ |

In the present disclosure, target grayscale compensation data of the virtual grayscale is generated according to the grayscale generation coefficient and the target grayscale compensation data of the block regions corresponding to two adjacent storage grayscales. Compared with directly calculating the target grayscale compensation data of the virtual grayscale through adjacent compensation value interpolation, the adjustment manner through the grayscale generation coefficient is more flexible and the compensation effect is more controllable. In addition, the compensation effect is better if ultra-low grayscales are optimized by using a plurality of virtual grayscales and multiple sets of RBG color shift coefficient adjustments.

According to the grayscale compensation data generation method provided in the embodiments of the present disclosure, firstly, brightness data of a plurality of grayscale images captured under a target shooting brightness is acquired, and different grayscale images correspond to different display grayscales. Secondly, original grayscale compensation data of pixels corresponding to different display grayscales is determined respectively according to the brightness data of the plurality of grayscale images, and storage grayscales are determined from a plurality of display grayscales. Thirdly, original grayscale compensation data of pixels corresponding to different storage grayscales is converted respectively into target grayscale compensation data of block regions corresponding to the different storage grayscales, and the block regions are regions including a plurality of pixels. Finally, the target grayscale compensation data of the block regions corresponding to the different storage grayscales is stored. During storage of the grayscale compensation data, the original grayscale compensation data of the pixels is converted into the target grayscale compensation data of the block regions in units of block regions, so that a storage capacity of the grayscale compensation data can be compressed.

How to determine the original grayscale compensation data is described below. FIG. 3 is a schematic flowchart of another grayscale compensation data generation method according to embodiments of the present disclosure. The grayscale compensation data generation method includes S301 to S308.

In S301, brightness data of a plurality of grayscale images captured under a target shooting brightness is acquired, and different grayscale images correspond to different display grayscales.

The brightness data of the grayscale image includes brightness data of a plurality of pixels in the grayscale images.

In S302, a preset grayscale-brightness relation curve function is solved according to the brightness data of the plurality of pixels in the plurality of grayscale images, and relation parameters in a grayscale-brightness relation curve are determined.

In S303, a grayscale difference function is generated according to the relation parameters in the grayscale-brightness relation curve.

In S304, standard brightness data for different display grayscales is acquired, and the standard brightness data is brightness data in central regions of the corresponding grayscale images.

In S305, the standard brightness data for the different display grayscales and the brightness data of the plurality of pixels in the grayscale images corresponding to the different display grayscales are inputted to the grayscale difference function to obtain, by solving, the original grayscale compensation data of the pixels corresponding to the different display grayscales.

In S306, storage grayscales are determined from a plurality of display grayscales.

In S307, original grayscale compensation data of pixels corresponding to different storage grayscales is converted respectively into target grayscale compensation data of block regions corresponding to the different storage grayscales, and the block regions are regions including a plurality of pixels.

In S308, the target grayscale compensation data of the block regions corresponding to the different storage grayscales is stored.

How to optimize the target grayscale compensation data is described below. FIG. 4 is a schematic flowchart of yet another grayscale compensation data generation method according to embodiments of the present disclosure. The grayscale compensation data generation method includes S401 to S409.

In S401, brightness data of a plurality of grayscale images captured under a target shooting brightness is acquired, and different grayscale images correspond to different display grayscales.

In S402, original grayscale compensation data of pixels corresponding to different display grayscales is determined respectively according to the brightness data of the plurality of grayscale images.

In S403, storage grayscales are determined from a plurality of display grayscales.

In S404, original grayscale compensation data of pixels corresponding to different storage grayscales is converted respectively into target grayscale compensation data of block regions corresponding to the different storage grayscales, and the block regions are regions including a plurality of pixels.

In S405, the target grayscale compensation data of the block regions corresponding to the different storage grayscales is stored.

In S406, virtual grayscale setting information is received, the setting information is used to set at least one virtual grayscale, and a value of the virtual grayscale is in a value interval formed by values of any two storage grayscales.

In S407, target grayscale compensation data of the block regions corresponding to the two storage grayscales adjacent to each virtual grayscale is acquired.

In S408, a preset grayscale generation coefficient is generated.

In S408, target grayscale compensation data for each virtual grayscale according to the target grayscale compensation data of the block regions corresponding to the two storage grayscales adjacent to each virtual grayscale and the grayscale generation coefficient.

According to the grayscale compensation data generation method provided in the embodiments of the present disclosure, firstly, brightness data of a plurality of grayscale images captured under a target shooting brightness is acquired, and different grayscale images correspond to different display grayscales. Secondly, original grayscale compensation data of pixels corresponding to different display grayscales is determined respectively according to the brightness data of the plurality of grayscale images, and storage grayscales are determined from a plurality of display grayscales. Thirdly, original grayscale compensation data of pixels corresponding to different storage grayscales is converted respectively into target grayscale compensation data of block regions corresponding to the different storage grayscales, and the block regions are regions including a plurality of pixels. Finally, the target grayscale compensation data of the block regions corresponding to the different storage grayscales is stored. During storage of the grayscale compensation data, the original grayscale compensation data of the pixels is converted into the target grayscale compensation data of the block regions in units of block regions, so that a storage capacity of the grayscale compensation data can be compressed.

It should be understood that, although the steps in the flowcharts as referred to in the embodiments described above are shown in sequence as indicated by the arrows, the steps are not necessarily performed in the order indicated by the arrows. Unless otherwise clearly specified herein, the steps are performed without any strict sequence limitation, and may be performed in other orders. In addition, at least some steps in the flowcharts as referred to in the embodiments described above may include a plurality of steps or a plurality of stages, and such steps or stages are not necessarily performed at a same moment, and may be performed at different moments. The steps or stages are not necessarily performed in sequence, and the steps or stages and at least some of other steps or steps or stages of other steps may be performed in turn or alternately.

Based on the same inventive concept, embodiments of the present disclosure further provide a grayscale compensation data generation apparatus configured to implement the grayscale compensation data generation method as referred to above. An implementation solution for solving the problems that is provided by the apparatus is similar to the implementation solution of the above method. Therefore, for specific limitations in one or more embodiments of the grayscale compensation data generation apparatus provided below, reference may be made to the limitations on the above grayscale compensation data generation method. Details are not described herein again.

Figure 5:
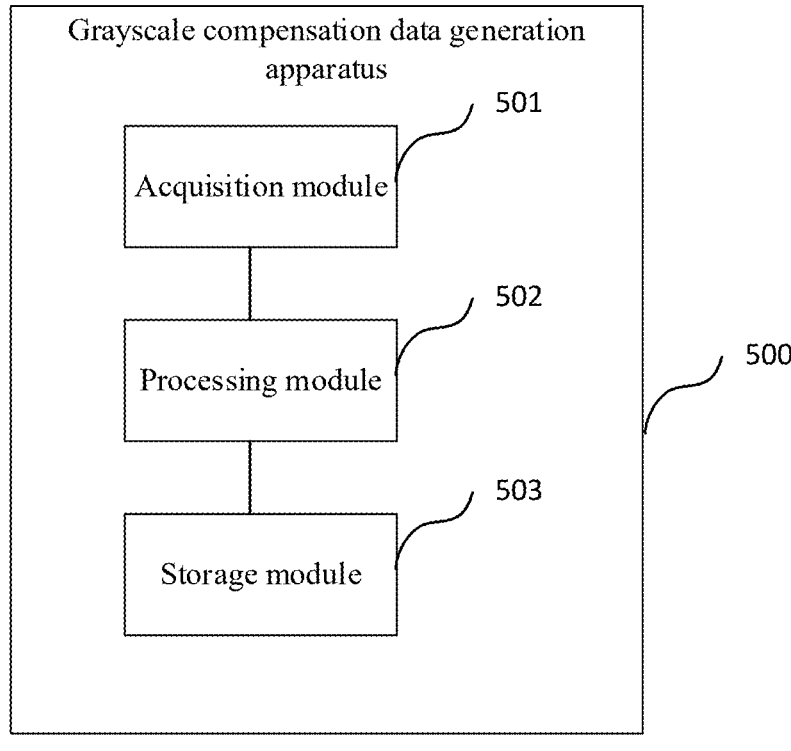
FIG. 5 is a structural block diagram of a grayscale compensation data generation apparatus according to embodiments of the present disclosure.

In an exemplary embodiment, as shown in FIG. 5, a grayscale compensation data generation apparatus 500 is provided, including: an acquisition module 501, a processing module 502, and a storage module 503.

The acquisition module 501 is configured to acquire brightness data of a plurality of grayscale images captured under a target shooting brightness. Different grayscale images correspond to different display grayscales.

The processing module 502 is configured to determine original grayscale compensation data of pixels corresponding to different display grayscales respectively according to the brightness data of the plurality of grayscale images; determine storage grayscales from a plurality of display grayscales; and convert original grayscale compensation data of pixels corresponding to different storage grayscales respectively into target grayscale compensation data of block regions corresponding to the different storage grayscales. The block region is a region including a plurality of pixels.

The storage module 503 is configured to store the target grayscale compensation data of the block regions corresponding to the different storage grayscales.

In an embodiment, the brightness data of the grayscale image includes brightness data of a plurality of pixels in the grayscale images, and the processing module 502 is further configured to solve a preset grayscale-brightness relation curve function according to the brightness data of the plurality of pixels in the plurality of grayscale images, and determine relation parameters in a grayscale-brightness relation curve; generate a grayscale difference function according to the relation parameters in the grayscale-brightness relation curve; acquire standard brightness data for different display grayscales, the standard brightness data being brightness data of central regions of the corresponding grayscale images, and input the standard brightness data for the different display grayscales and the brightness data of the plurality of pixels in the grayscale images corresponding to the different display grayscales into the grayscale difference function to obtain, by solving, the original grayscale compensation data of the pixels corresponding to the different display grayscales.

In an embodiment, the processing module 502 is further configured to acquire configuration data of at least one block region, the configuration data including a size of the block region and a conversion algorithm of the block region, determine, from the original grayscale compensation data of the pixels corresponding to the different storage grayscales, original grayscale compensation data of the plurality of pixels included in each of the block regions according to the size of the block region, and process the original grayscale compensation data of the plurality of pixels included in each of the block regions by using the conversion algorithm of the block region, to obtain the target grayscale compensation data.

In an embodiment, the conversion algorithm includes a median algorithm, a mean rounding algorithm, or a mode algorithm.

In an embodiment, the at least one block region includes a first-level block region and a second-level block region, and a size of the second-level block region is greater than a size of the first-level block region.

The processing module 502 is further configured to process original grayscale compensation data of a plurality of pixels included in the first-level block region by using a conversion algorithm of the first-level block region, to obtain a first compensation calculation value, process original grayscale compensation data of a plurality of pixels included in the second-level block region by using a conversion algorithm of the second-level block region, to obtain a second compensation calculation value, and obtain the target grayscale compensation data according to the first compensation calculation value and the second compensation calculation value.

In an embodiment, the target shooting brightness includes a first shooting brightness and a second shooting brightness, the target grayscale compensation data includes first target grayscale compensation data under the first shooting brightness and second target grayscale compensation data under the second shooting brightness, and the grayscale compensation data generation apparatus 500 further includes:

an optimization module configured to weight the first target grayscale compensation data and the second target grayscale compensation data, to obtain final grayscale compensation data of the block regions corresponding to the different storage grayscales.

In an embodiment, subsequent to storing the target grayscale compensation data of the block regions corresponding to the different storage grayscales, the optimization module is further configured to receive virtual grayscale setting information, the setting information being used to set at least one virtual grayscale, a value of the virtual grayscale being in a value interval formed by values of any two storage grayscales, acquire target grayscale compensation data of the block regions corresponding to the two storage grayscales adjacent to each virtual grayscale, acquire a preset grayscale generation coefficient, and generate target grayscale compensation data for each virtual grayscale according to the target grayscale compensation data of the block regions corresponding to the two storage grayscales adjacent to each virtual grayscale and the grayscale generation coefficient.

The modules in the above grayscale compensation data generation apparatus may be implemented entirely or partially by software, hardware, or a combination thereof. The above modules may be built in or independent of a processor of a computer device in a hardware form, or may be stored in a memory of the computer device in a software form, to facilitate the processor to invoke and perform operations corresponding to the above modules.

In an exemplary embodiment, a computer device is provided. The computer device may be the above processing device. The processing device may be a terminal or a server. A diagram of an internal structure thereof may be shown in FIG. 6. The computer device includes a processor, a memory, an input/output (I/O) interface, and a communication interface. The processor, the memory, and the I/O interface are connected by a system bus. The communication interface is connected to the system bus by the I/O interface. The processor of the computer device is configured to provide computing and control capabilities. The memory of the computer device includes a non-transitory storage medium and an internal memory. The non-transitory storage medium stores an operating system, a computer program, and a database. The internal memory provides an environment for running of the operating system and the computer program in the non-transitory storage medium. The database of the computer device is configured to store motion vector data. The I/O interface of the computer device is configured to exchange information between the processor and an external device. The communication interface of the computer device is configured to communicate with an external terminal through a network connection. The computer program is executed by the processor to implement a grayscale compensation data generation method.

Figure 6:
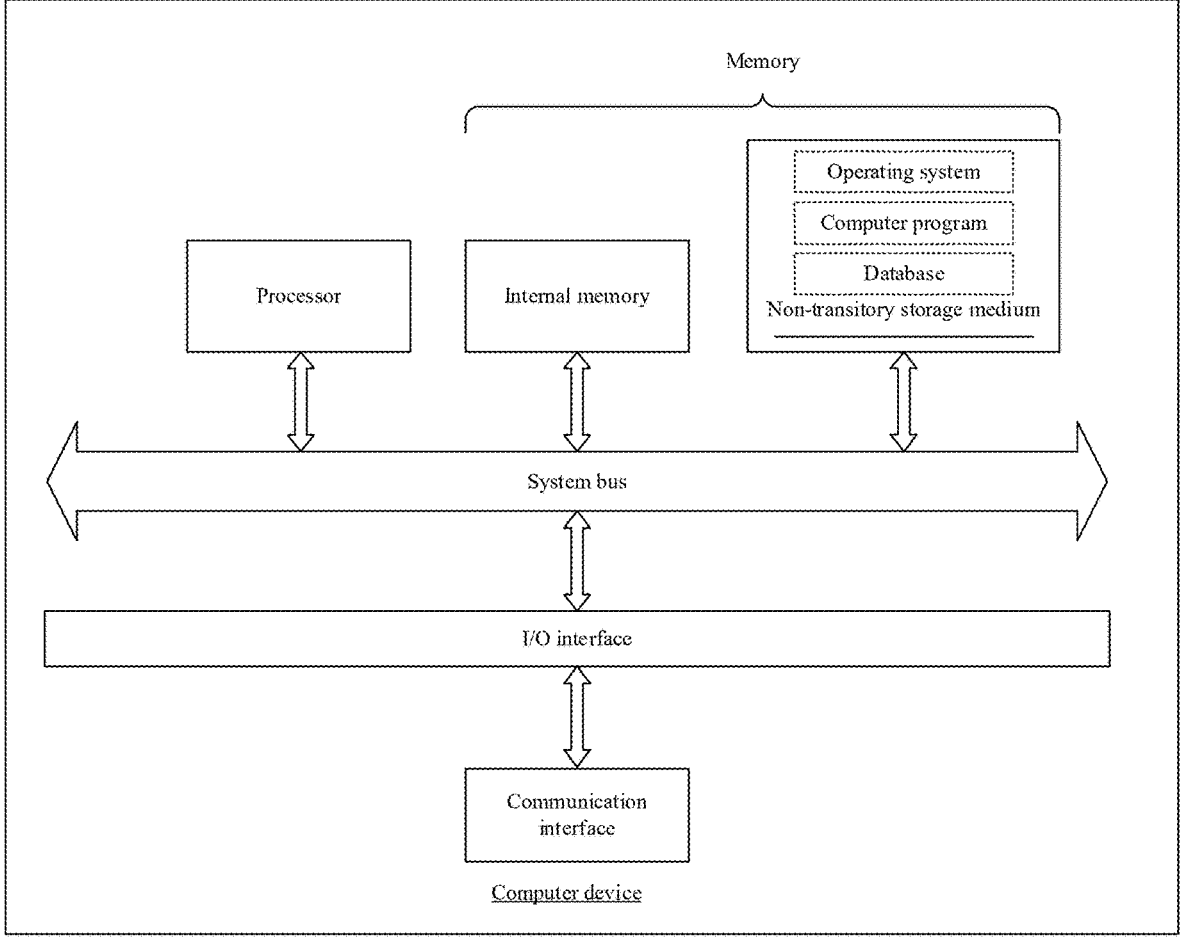
FIG. 6 is a diagram of an internal structure of a computer device according to embodiments of the present disclosure.

Those skilled in the art may understand that, the structure shown in FIG. 6 is only a block diagram of a partial structure related to a solution of the present disclosure, which does not constitute a limitation on the computer device to which the solution of the present disclosure is applied. Specifically, the computer device may include more or fewer components than those shown in the figure, or some components may be combined, or a different component deployment may be used.

In an exemplary embodiment, a computer device is provided, including a memory and a processor. The memory stores a computer program. The processor, when executing the computer program, implements the above grayscale compensation data generation method.

In an embodiment, a computer-readable storage medium is provided, having a computer program stored therein. When the computer program is executed by a processor, the above grayscale compensation data generation method is implemented.

In an embodiment, a computer program product is provided, including a computer program. When the computer program is executed by a processor, the above grayscale compensation data generation method is implemented.

Those of ordinary skill in the art may understand that some or all procedures in the methods in the foregoing embodiments may be implemented by a computer program instructing related hardware, the computer program may be stored in a non-transitory computer-readable storage medium, and when the computer program is executed, the procedures in the foregoing method embodiments may be implemented. Any reference to the memory, database, or other media used in the embodiments provided in the present disclosure may include at least one of a non-transitory memory and a transitory memory. The non-transitory memory may include a read-only memory (ROM), a magnetic tape, a floppy disk, a flash memory, an optical memory, a high-density embedded non-transitory memory, a resistive random access memory (ReRAM), a magnetoresistive random access memory (MRAM), a ferroelectric random access memory (FRAM), a stage change memory (PCM), a graphene memory, and the like. The transitory memory may include a random access memory (RAM) or an external cache. By way of illustration instead of limitation, the RAM is available in a variety of forms, such as a static random access memory (SRAM) or a dynamic random access memory (DRAM). The database as referred to in the embodiments provided in the present disclosure may include at least one of a relational database and a non-relational database. The non-relational database may include a block-chain-based distributed database, and the like, but is not limited thereto. The processor as referred to in the embodiments provided in the present disclosure may be a general-purpose processor, a central processing unit, a graphics processor, a digital signal processor, a programmable logic device, a data processing logic device based on quantum computing, an artificial intelligence (AI) processor, or the like, but is not limited thereto.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the protection scope of the present disclosure should be subject to the appended claims.

The invention claimed is:

1. A grayscale compensation data generation method, comprising:

acquiring brightness data of a plurality of grayscale images captured under a target shooting brightness, different grayscale images corresponding to different display grayscales;

determining original grayscale compensation data of pixels corresponding to different display grayscales respectively according to the brightness data of the plurality of grayscale images;

determining storage grayscales from a plurality of display grayscales;

converting original grayscale compensation data of pixels corresponding to different storage grayscales respectively into target grayscale compensation data of block regions corresponding to the different storage grayscales, the block regions each being a region comprising a plurality of pixels;

storing the target grayscale compensation data of the block regions corresponding to the different storage grayscales.

2. The method according to claim 1, wherein the brightness data of the grayscale images comprises brightness data of a plurality of pixels in the grayscale images; and determining the original grayscale compensation data of the pixels corresponding to the different display grayscales respectively according to the brightness data of the plurality of grayscale images comprises:

solving a preset grayscale-brightness relation curve function according to the brightness data of the plurality of pixels in the plurality of grayscale images, and determining relation parameters in a grayscale-brightness relation curve;

generating a grayscale difference function according to the relation parameters in the grayscale-brightness relation curve;

acquiring standard brightness data for different display grayscales, the standard brightness data being brightness data of in central regions of the corresponding grayscale images;

inputting the standard brightness data for the different display grayscales and the brightness data of the plurality of pixels in the grayscale images corresponding to the different display grayscales into the grayscale difference function to obtain, by solving, the original grayscale compensation data of the pixels corresponding to the different display grayscales.

3. The method according to claim 1, wherein converting the original grayscale compensation data of the pixels corresponding to the different storage grayscales respectively into the target grayscale compensation data of the block regions corresponding to the different storage grayscales comprises:

acquiring configuration data of at least one block region, the configuration data comprising a size of the block region and a conversion algorithm of the block region;

determining, from the original grayscale compensation data of the pixels corresponding to the different storage grayscales, original grayscale compensation data of the plurality of pixels comprised in each of the block regions according to the size of the block region;

processing the original grayscale compensation data of the plurality of pixels comprised in each of the block regions by using the conversion algorithm of the block region, to obtain the target grayscale compensation data.

4. The method according to claim 3, wherein the conversion algorithm comprises a median algorithm, a mean rounding algorithm, or a mode algorithm.

5. The method according to claim 3, wherein the at least one block region comprises a first-level block region and a second-level block region, and a size of the second-level block region being greater than a size of the first-level block region; and processing the original grayscale compensation data of the plurality of pixels comprised in each of the block regions by using the conversion algorithm of the block region, to obtain the target grayscale compensation data comprises:

processing original grayscale compensation data of a plurality of pixels comprised in the first-level block region by using a conversion algorithm of the first-level block region, to obtain a first compensation calculation value;

processing original grayscale compensation data of a plurality of pixels comprised in the second-level block region by using a conversion algorithm of the second-level block region, to obtain a second compensation calculation value;

obtaining the target grayscale compensation data according to the first compensation calculation value and the second compensation calculation value.

6. The method according to claim 1, wherein the target shooting brightness comprises a first shooting brightness and a second shooting brightness; the target grayscale compensation data comprises first target grayscale compensation data under the first shooting brightness and second target grayscale compensation data under the second shooting brightness; and the method further comprises:

weighting the first target grayscale compensation data and the second target grayscale compensation data, to obtain final grayscale compensation data of the block regions corresponding to the different storage grayscales.

7. The method according to claim 1, further comprising: subsequent to storing the target grayscale compensation data of the block regions corresponding to the different storage grayscales, receiving virtual grayscale setting information, the setting information being used to set at least one virtual grayscale, a value of the virtual grayscale being in a value interval formed by values of any two storage grayscales;

acquiring target grayscale compensation data of the block regions corresponding to the two storage grayscales adjacent to each virtual grayscale;

acquiring a preset grayscale generation coefficient;

generating target grayscale compensation data for each virtual grayscale according to the target grayscale compensation data of the block regions corresponding to the two storage grayscales adjacent to each virtual grayscale and the grayscale generation coefficient.

8. A computer device, comprising a memory and a processor, the memory storing a computer program, wherein the processor, when executing the computer program, implements steps of the method according to claim 1.

9. A non-transitory computer-readable storage medium, having a computer program stored therein, wherein when the computer program is executed by a processor, steps of the method according to claim 1 are implemented.

10. A computer program product, comprising a non-transitory, computer-readable storage medium having computer program stored thereon, wherein when the computer program is executed by a processor, steps of the method according to claim 1 are implemented.

11. A grayscale compensation data generation apparatus, comprising:

an acquisition module configured to acquire brightness data of a plurality of grayscale images captured under a target shooting brightness, different grayscale images corresponding to different display grayscales;

a processing module configured to determine original grayscale compensation data of pixels corresponding to different display grayscales respectively according to the brightness data of the plurality of grayscale images; determine storage grayscales from a plurality of display grayscales; and convert original grayscale compensation data of pixels corresponding to different storage grayscales respectively into target grayscale compensation data of block regions corresponding to the different storage grayscales, the block regions each being a region comprising a plurality of pixels;

a storage module configured to store the target grayscale compensation data of the block regions corresponding to the different storage grayscales.

* * * * *